(12) United States Patent
Schuerch

(10) Patent No.: US 6,804,846 B2
(45) Date of Patent: Oct. 19, 2004

(54) SHOULDER ARTHROSCOPY CHAIR

(76) Inventor: Peter Schuerch, 42 Bayview Ave., Quincy, MA (US) 02043

( * ) Notice: Subject to any disclaimer, the term of this patent is extended or adjusted under 35 U.S.C. 154(b) by 0 days.

(21) Appl. No.: 10/097,225

(22) Filed: Mar. 14, 2002

(65) Prior Publication Data
US 2003/0172460 A1 Sep. 18, 2003

(51) Int. Cl.⁷ .............................................. A47C 20/00
(52) U.S. Cl. ....................... 5/635; 5/600; 5/612; 5/630; 5/632
(58) Field of Search ........................... 5/600, 612, 621, 5/622, 623, 632–635; 297/352

(56) References Cited

U.S. PATENT DOCUMENTS

| 2,250,026 A | * | 7/1941 | Laukhuff | 5/634 |
| 3,277,501 A | * | 10/1966 | Frisz et al. | 5/617 |
| 5,135,210 A | * | 8/1992 | Michelson | 5/658 |
| 5,275,176 A | * | 1/1994 | Chandler | 5/613 |
| 5,829,077 A | * | 11/1998 | Neige | 5/618 |
| 5,926,876 A | * | 7/1999 | Haigh et al. | 5/617 |
| 6,023,800 A | * | 2/2000 | Stickley | 5/621 |
| 6,029,669 A | * | 2/2000 | Hammock | 128/845 |
| 6,250,712 B1 | * | 6/2001 | Livington et al. | 297/4 |
| 6,499,158 B1 | * | 12/2002 | Easterling | 5/600 |
| 6,557,195 B2 | * | 5/2003 | Dinkler | 5/601 |
| 6,564,406 B2 | * | 5/2003 | VanSteenburg et al. | 5/621 |
| 6,568,008 B2 | * | 5/2003 | Siepmann et al. | 5/617 |

* cited by examiner

Primary Examiner—Teri Pham Luu
(74) Attorney, Agent, or Firm—John M. Brandt

(57) ABSTRACT

An adjustable position shoulder arthroscopy chair for surgical operating tables consisting of a back supporting platform pivotally attachable to the end of the table and an externally powered position actuator mounted at the base of the platform nearest the table and pivotally mounted to the platform at a location spaced apart from the base. The actuator is extendable and retractable and may be powered either electrically, hydraulically, or by compressed air. The extension and retraction of the actuator is controlled by a suitable device within the actuator or remote from it.

11 Claims, 2 Drawing Sheets

ELECTRICAL HYDRAULIC OR COMPRESSED AIR POWER SOURCE

SHOULDER ARTHROSCOPY CHAIR

BACKGROUND OF THE INVENTION

1. Field of the Invention

The invention resides in the field of operating room appliances and more particularly relates to adjustable devices for placing a patient in a wide range of positions for surgical procedures.

2. Description of the Prior Art

The invention disclosed herein is directed to a body positioner to be used in conjunction with an operating or surgical table to orient a patient in a convenient and accessible attitude for surgical procedures. The apparatus described is arranged to raise or lower the upper body of a patient lying on an operating table and consists of a platform rotatably hinged about the end of the table. The patient's back rests against the platform and, as it is rotated, moves the patient from a lying down to a sitting up position. The main purpose of the chair is to provide the ability to continuously orient the patient's shoulder and upper arm into a convenient position as the surgery progresses.

To this end, means are provided to hold the chair or platform in a variety of positions. The prior art known to applicant utilizes a locking ratchet mechanism operated by the surgeon or an attendant to first physically move the chair to the desired angular orientation and then to engage, or disengage for repositioning, the locking mechanism. In prior art devices, the mechanisms utilize discrete angular positions of specified angles allowing no positions in between.

In contrast, the present invention allows an infinite number of angular positions between the upper and lower limits and provides an externally powered actuator to accomplish the rotation of the platform. By these means, the manual manipulation, physical effort, and possible physical strain required by the prior art devices known to applicant is eliminated and a complete range of positions is made available to the surgeon rather than a set of preselected discrete settings.

SUMMARY OF THE INVENTION

The invention may be summarized as a patient positioning apparatus for use in conjunction with a surgical table which is directed to the lowering and raising of the upper body as an aid to, for example, the performance of shoulder surgery. The device is in the form of a chair having an adjustable backrest or upper body platform pivotally connected to a base which is arranged to be secured to a surgical table.

The platform rotates about the base and is moved and fixed in position by an externally powered actuator connected between the base and the platform at a point spaced apart from the base. The actuator extends or retracts upon command by a control means which either forms a part of the actuator or is remote from it.

Power for the actuator is preferably electrical but hydraulic or compressed air units are envisioned as well. A seat extending from the base arranged to rest upon the surgical table may optionally be provided. Additionally, portions of the platform may be removable to facilitate access to the patient.

As the invention is intended to be secured to a surgical table, preferably on both sides, a novel clamp allowing for dimensional differences in the width of the table is also disclosed. These and other features and advantages of the invention will be more fully understood from the description of the preferred embodiment taken with the drawings which follows.

DESCRIPTION OF THE PREFERRED EMBODIMENT

Figure 1:
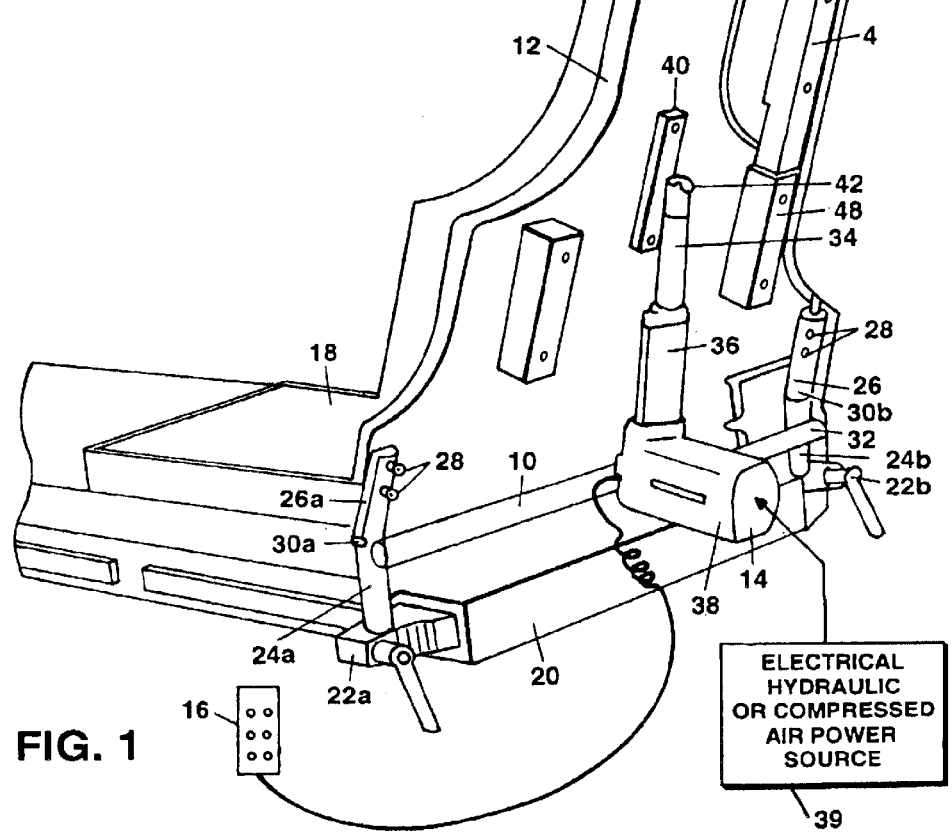
FIG. 1 is a perspective view of the preferred embodiment of the invention.

Referring first to FIG. 1, there is shown a perspective view of the preferred embodiment of the invention comprising a base 10, a patient upper body support platform 12, an extendable and retractable externally powered position actuator 14, and a control module 16 which module activates and operates actuator 14. The shoulder arthroscopy chair as shown may also include a seat 18 and is secured to surgical table 20 by, for example, clamps 22a and 22b arranged to receive posts 24a and 24b which form a portion of base 10. Extensions 26a and 26b form an additional part of the base and are mounted to support platform 12 by screws 28. Each pair of posts 24 and extensions 26 are pivotally engaged at pivots 30a and 30b allowing support platform 12 to rotate in relation to table 20 to raise and lower the upper body of a patient.

Actuator 14 is mounted to horizontal bar 32 which further functions as that part of the base which unites posts 24a and 24b. Piston 34 is arranged to extend from or retract into sleeve 36 as commanded by control module 16 communicating with driver 38, an electric motor for example. The opposite end of piston 34 is pivotally mounted to platform 12 by bracket 40 at pivot 42.

The actuator 14 and control module 16 are commercially available devices. A suitable unit, the ECOMAG, is manufactured by Magnetic AG, Liestal, Switzerland. While an electrically powered device constitutes the preferred embodiment, compressed air or hydraulically operated actuators are also contemplated as is indicated by power source 39.

As illustrated, platform 12 may have removable portions or extensions to support that part of the patient not undergoing surgery and provide access where needed. Shown is right side extension 44 having mounting post 46 which is slidably arranged to fit into mounting bracket 48 attached to platform 12. The opposite or left side extension is not shown having been removed.

Figure 2:
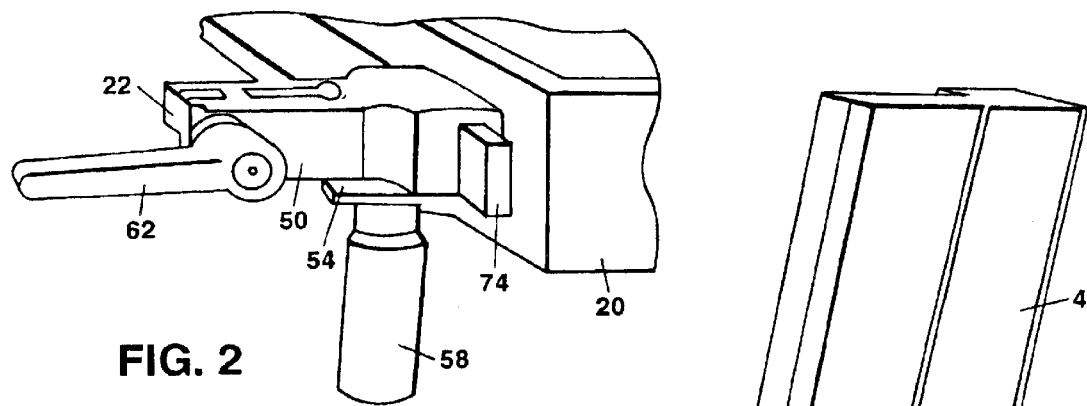
FIG. 2 is a perspective view of a component of the embodiment of FIG. 1.
Figure 3:
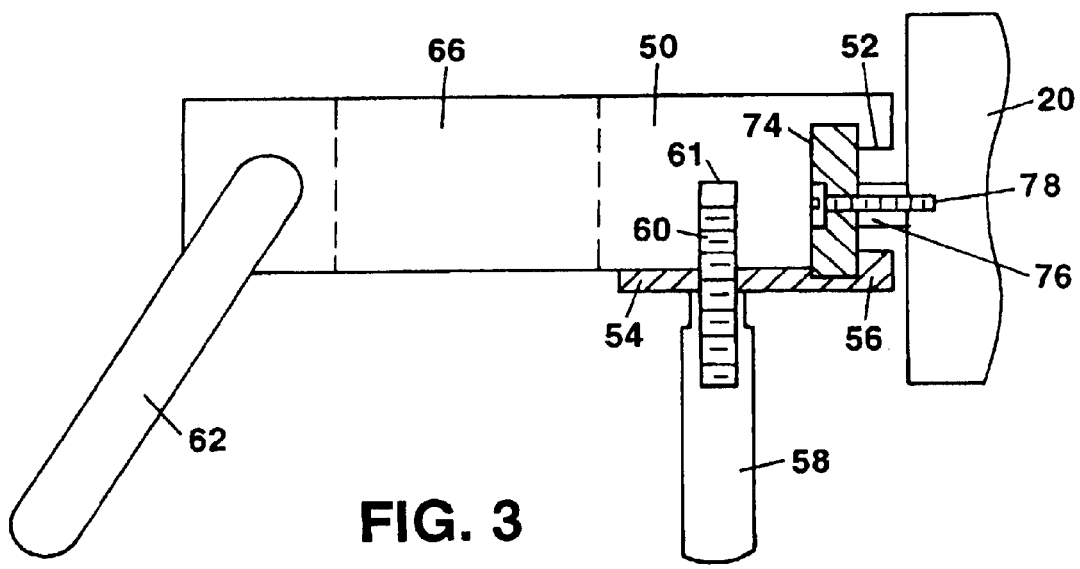
FIG. 3 is a side view of the component of FIG. 2.
Figure 4:
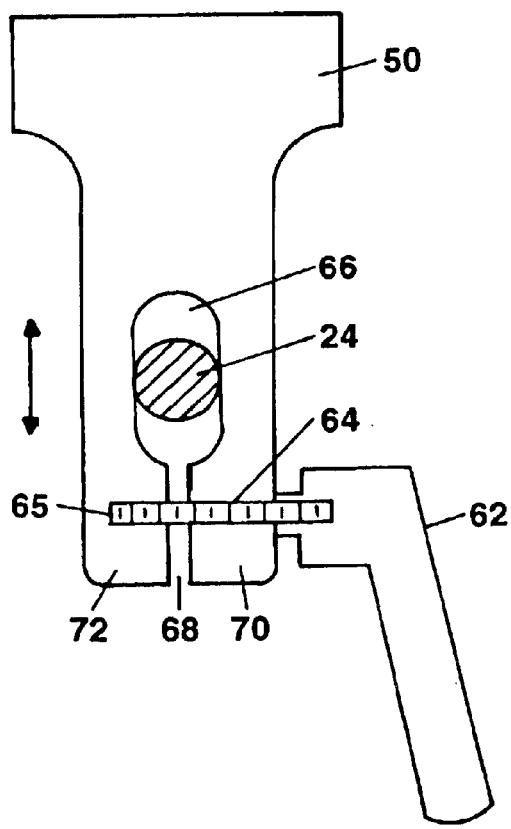
FIG. 4 is a plan view of the component of FIG. 2.

Referring next to FIGS. 2, 3, and 4, there is illustrated a novel clamp which facilitates the use of the invention with surgical tables of varying dimension. Clamp 22 consists of clamp body 50 having top rail engaging lip 52, plate 54 having bottom rail engaging lip 56, plate clamping handle 58 attached to bolt 60 engaging threaded bore 61, and post clamping handle 62 attached to bolt 64 engaging threaded bore 65. Elliptical or oval port 66 is disposed in clamp body 50 for receiving post 24. The width of port 66 is about equal to the diameter of post 24 as shown in FIG. 4 and is of sufficient length to allow for some variation in the width of surgical tables. This structure will also facilitate setting up the chair without binding. Further shown in FIG. 4 is slot 68 to allow compression of clamp body sides 70 and 72 by handle 62 in conjunction with bolt 64.

Illustrated in FIG. 3 is the detail of the side of surgical table 20 showing rail 74 attached to table 20 by one of a plurality of standoffs 76 secured by screws 76.

As variations in the above described embodiment will now be apparent to those skilled in the art, the invention is accordingly defined by the following claims.

What is claimed is:

1. An adjustable position shoulder arthroscopy chair arranged for use with a surgical table, said chair comprising in combination:
   a. a base member attachable to a surgical table, said base member comprising a substantially horizontal member and two substantially vertical post member one each attached at each end of said horizontal member and further including an extension mounted at each end of the base of said platform said extensions pivotally attached one each to each of said vertical post member;
   b. a patient upper body supporting platform pivotally attached to said base member;
   c. an extendable and retractable externally powered position actuator having a first actuator pivot pivotally attached at one end to said base member and having a second actuator pivot pivotally attached to said platform at a position spaced apart from said first pivot; and
   d. control means for extending and retracting said actuator whereupon, upon operation of said control means, the position of said platform and said patient upper body will be adjusted in relation to said table.

2. The arthroscopy chair of claim 1 further including clamping means attachable to said base for securing said base to said table.

3. The arthroscopy chair of claim 1 further including a seat member extending from said base member arranged to rest on the surface of said table.

4. The arthroscopy chair of claim 1 wherein said power comprises electrical power.

5. The arthroscopy chair of claim 1 wherein said power comprises hydraulic power.

6. The arthroscopy chair of claim 1 wherein said power comprises compressed air power.

7. A clamp for attaching a post equipped arthroscopy chair to a rail of a surgical operating table comprising in combination:
   a. a clamp body for engaging one edge of said rail;
   b. a plate for engaging the opposite edge of said rail;
   c. first bolt means disposed in said clamp body engaging said plate for biasing said plate against said opposite edge;
   d. a port disposed in said clamp body for receiving said post, said port having ends having diameters about equal to said post diameter and a rectangular port communicating between said ends of a width about equal to said post diameter and of a length greater than said post diameter whereby said post may be located at different positions within said port;
   e. a slot having two opposite edges and communicating with said port; and
   f. second bolt means disposed in said clamp body traversing said slot for biasing one edge of said slot towards the other whereby upon rotating said second bolt means, said post will be held or released from said port.

8. The clamp of claim 7 wherein said clamp further comprises a handle attached to each of said bolt means.

9. An position shoulder arthroscopy chair arranged for use with a surgical table, said chair comprising in combination:
   a. a base member attachable to a surgical table, said base member comprising a substantially horizontal member and two substantially vertical post members one each attached at each end of said horizontal member;
   b. a patient upper body supporting platform, said platform including an extension mounted at each end of the base of said platform, said extensions pivotally attached one each to each of said vertical post members;
   c. a pair of clamps for attaching said vertical post members to a rail of a surgical operating table each of said clamps comprising in combination:
      1. a clamp body for engaging one edge of said rail;
      2. a plate for engaging the opposite edge of said rail;
      3. first bolt means disposed in said clamp body engaging said plate for biasing said plate against said opposite edge;
      4. a port disposed in said clamp body for receiving said vertical post, said port having ends having diameters about equal to said post diameter and a rectangular port communicating between said ends of a width about equal to said post diameter and of a length greater than said post diameter whereby said post may be located at different positions within said port;
      5. a slot having two opposite edges and communicating with said port; and
      6. second bolt means disposed in said clamp body traversing said slot for biasing one edge of said slot towards the other whereby upon rotating said second bolt means, said posts will be held or released from said port.
   d. an extendable and retractable externally powered position actuator having a first actuator pivot pivotally attached at one end to said base member and having a second actuator pivot pivotally attached to said platform at a position spaced apart from said first pivot; and
   e. control means for extending and retracting said actuator whereupon, upon operation of said control means, the position of said platform and said patient upper body will be adjusted in relation to said table.

10. The arthroscopy chair of claim 9 further including a seat member extending from said base member arranged to rest on the surface of said table.

11. The arthroscopy chair of claim 9 wherein said clamps further comprise a handle handle attached to each of said bolt means.

* * * * *